United States Patent Office 3,780,189
Patented Dec. 18, 1973

3,780,189
SWEETENING COMPOSITIONS AND METHOD
FOR USE THEREOF
Don Scott, Skokie, Ill., assignor to
G. D. Searle & Co., Chicago, Ill.
No Drawing. Continuation-in-part of abandoned application Ser. No. 823,482, May 9, 1969. This application Sept. 13, 1971, Ser. No. 180,061
Int. Cl. A23l 1/26
U.S. Cl. 426—212                    19 Claims

ABSTRACT OF THE DISCLOSURE

Novel compositions containing a sweet dipeptide and known sweetening agents possess enhanced sweetening potency and are useful for the sweetening of edible materials.

---

This application is a continuation-in-part of my copending application Ser. No. 823,482, filed May 9, 1969, now abandoned.

The present invention relates to novel compositions and a method adapted for use in the sweetening of edible materials.

The compositions of the present invention contain, as one of the active ingredients, a dipeptide characterized by the following structural formula

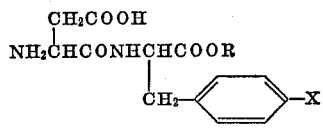

wherein X is hydrogen or hydroxy and R is a lower alkyl radical. These compounds are described in U.S. Pats. 3,492,131 and 3,475,403.

It has surprisingly been discovered that when a dipeptide within the scope of the latter structural formula is mixed with known sweetening agents, e.g. saccharin or sucrose, the sweetening potency of the mixture is enhanced. This synergistic effect is completely unexpected and could not have been predicted from a knowledge of the art. Thus, in known sweetening mixtures, e.g. saccharin and cyclamate, the sweetening effects are cumulative. There is no potentiating effect of one agent upon the other.

A preferred embodiment of this invention is a composition containing saccharin and one of the aforementioned dipeptides.

An especially preferred embodiment of this invention is a composition containing saccharin and an aspartylphenylalanine methyl ester.

A most especially preferred embodiment of this invention is a composition containing saccharin and L-aspartyl-L-phenylalanine methyl ester.

The dipeptides which compose one of the active ingredients of the instant compositions have sweetening potencies in the range of 25–150 times that of sucrose. An especially potent dipeptide is L-aspartyl-L-phenylalanine methyl ester, which has a potency in the range of 100–150 times that of sucrose.

The compositions of this invention may be utilized in a variety of physical forms, e.g. solid forms such as powders, tablets, granules, dragees, and liquid forms such as solutions, suspensions, syrups, emulsions as well a other commonly employed forms particularly suited for combination with edible materials. These forms can consist of the active ingredients alone or in association with non-toxic sweetening agent carriers, i.e. non-toxic substances commonly employed in association with sweetening agents.

Such suitable carriers include liquids such as water, ethanol, sorbitol, glycerol, citric acid, corn oil, sesame oil, propylene glycol and corn syrup and solids such as lactose, cellulose, starch, dextrins and other modified starches, salt, and calcium phosphate.

The sweetening potency of saccharin is, depending upon the edible material to which it is added, up to 500 times that of sucrose. It has been surprisingly discovered that when saccharin is mixed with one of the aforementioned dipeptides, the sweetening potency is greatly enhanced. The addition of L-aspartyl-L-phenylalanine methyl ester, for example, to saccharin in coffee raises its potency to about 1000. It has been found that this synergistic effect is manifest over a range of ratios of saccharin to dipeptide of between about 1:15 and 15:1, with the range of ratios of saccharin to dipeptide of between about 1:15 and 5:1 being particularly preferred.

Edible materials to which the instant compositions can be added include fruits, vegetables, juices, meat products such as ham, bacon, and sausage, egg products, fruit concentrates, salad dressings, milk products such as ice cream and sherbet, icings, syrups, corn, wheat and rice products such as bread, cereals, and cake mixes, fish, cheese and cheese products, nut products, beverages such as coffee, tea, carbonated soft drinks, beers and wines, and confections such as candy.

An example of a suitable tablet adapted for addition to edible materials, e.g. coffee, is as follows:

|  | Mg. |
|---|---|
| L-aspartyl-L-phenylalanine methyl ester | 25 |
| Saccharin | 5 |
| Mannitol | 200 |
| Sorbitol | 5 |
| Magnesium stearate | 1 |

Specific examples of the synergistic effect resulting from the mixture of the instant dipeptides with known sweetening agents are given below. The concentrations recited in the following formulations are given for the purpose of illustration only and it is recognized that individual taste preferences for degrees of sweetness vary so substantially that it is difficult to delineate well defined limits for useable ranges of concentrations.

EXAMPLE 1

A non-carbonated imitation strawberry drink is prepared using four different sweetening compositions: (1) sucrose alone, (2) L-aspartyl-L-phenylalanine methyl ester alone, (3) saccharin alone and (4) saccharin and L-aspartyl-L-phenylalanine methyl ester together. The compositions of each mixture, amounting to a total volume of 300 ml., are shown below:

Sucrose alone:                                       G.
    Sucrose _____ 27
    Dextrose _____ 2.61
    Citric acid _____ 0.15
    Imitation strawberry flavor (Dragoco
        N1132) _____ 0.12
    Lactose _____ 1.827
    Water _____ 268

L-aspartyl-L-phenylalanine methyl ester alone:
    L-aspartyl-L-phenylalanine methyl ester _____ 0.216
    Citric acid _____ 0.15
    Imitation strawberry flavor (Dragoco
        N1132) _____ 0.12
    Lactose _____ 1.827
    Water _____ 299

Saccharin alone:　　　　　　　　　　　　　　　　G.
　　Saccharin _____ 0.054
　　Citric acid _____ 0.15
　　Lactose _____ 1.827
　　Imitation strawberry flavor (Dragoco N1132) _____ 0.12
　　Water _____ 299

Saccharin plus L-aspartyl-L-phenylalanine methyl ester:
　　L-aspartyl-L-phenylalanine methyl ester ____ 0.108
　　Citric acid _____ 0.15
　　Lactose _____ 1.827
　　Saccharin _____ 0.0165
　　Imitation strawberry flavor (Dragoco N1132) _____ 0.12

It was determined by a taste panel that each of the latter preparations was equivalent in sweetness.

EXAMPLE 2

Approximately 3000 ml. of instant coffee is prepared by dissolving 16.5 g. of instant coffee in 3000 ml. of water. 600 ml. portions of the instant coffee is taken and to each was added one of the following sweetening preparations: (1) 24 g. of sucrose, (2) 0.16 g. of L-aspartyl-L-phenylalanine methyl ester, (3) 0.048 g. of saccharin and (4) 0.012 g. of saccharin with 0.08 g. of L-aspartyl-L-phenylalanine methyl ester.

It was determined by a taste panel that each of the latter sweetened coffees has an equivalent sweet taste.

EXAMPLE 3

The following table shows the sweetening equivalent values (S.E.V.) obtained when L-aspartyl-L-phenylalanine methyl ester, sodium saccharin and mixtures of those two agents were evaluated, using sucrose as the control, by the method described hereinafter. That data demonstrates a synergistic effect in mixtures containing both L-aspartyl-L-phenylalanine methyl ester (APM) and sodium saccharin (SS).

| Composition | Sucrose | APM | SS | SS in APM/saccharin mixtures* |
|---|---|---|---|---|
| Coffee (4% sucrose) | 1 (control) | ᵃ150 | ᵇ315 | ᵈ1,020 |
| Kool Aid (9% sucrose) | 1 (control) | ᵃ125 | ᶜ<210 | ᵉ820 |

*In which it is assumed that the sweetness equivalent value of L-aspartyl-L-phenylalanine methyl ester remains unchanged.

ᵃ Initial informal evaluation by 3-5 trained panelists who knew what samples they were testing. This panel determined the levels to be used in a formal panel which followed, having 11 judges and using the two sample difference test (Hall, Tarver and McDonald, Food Technology, page 699 (December 1959)) and the ranking test (Kramer, Food Technology, page 576 (November 1960) and Kramer, Food Technology, page 124 (December 1963)).

ᵇ A paired comparison test with 30 semitrained judges at four sodium saccharin hypothesized levels (250, 350, 450, and 550 as S.E.V.) and the interpolated S.E.V. of 315 would represent an equally divided panel. Each sample is compared to the sucrose control and two unidentified pairs were presented at each sitting in a controlled environment using formal tasting booths.

ᶜ As with footnote b above, except S.E.V.'s were 130, 170, 210 and 250 and at the lower two S.E.V.'s no sweetness comparison could be made due to the overwhelming bitterness of the saccharin (S.E.V. of 130 is about 700 p.p.m. of sodium saccharin).

ᵈ In this experiment it must be borne in mind that the L-aspartyl-L-phenylalanine methyl ester is assumed to remain stable in its sweetness value of 150 (for the coffee) or 125 (for the Kool Aid). This assumption merely provides a way of looking at saccharin potency in the presence or absence of the dipeptide. The same conclusions could be derived if saccharin sweetness were assumed stable in the mixture. The S.E.V. contribution then assigned to the sodium saccharin would represent its contribution in a drink in which half of the sweetness comes from each sweetener (L-aspartyl-L-phenylalanine methyl ester and sodium saccharin). A panel of 11 semi-trained judges was about equally divided as to whether the sucrose sweetened coffee or the coffee containing the mixture [of sodium saccharin (S.E.V. assumed 1020) and L-aspartyl-L-phenylalanine methyl ester (S.E.V. assumed 150) when added such that each would contribute to half of the sweetness] was sweeter.

ᵉ This S.E.V. of 820 was assumed as in footnote d but in this drink other S.E.V.'s were tried for the sodium saccharin portion of the mixture. Again the S.E.V. of L-aspartyl-L-phenylalanine methyl ester was assumed to be as in the drink with L-aspartyl-L-phenylalanine methyl ester only (i.e., 125). The saccharin which was set to contribute 50% of the sweetness was tested at the following hypothesized S.E.V.'s (600, 820, 1020, 1500). The drink formulated assuming 820 S.E.V. for saccharin and 125 for L-aspartyl-L-phenylalanine methyl ester was found by a semi-trained panel of 11 using the two sample difference ranking test cited herein to be closest to the 9% sucrose control.

EXAMPLE 4

Aqueous samples of L-aspartyl-L-phenylalanine methyl ester (APM), sodium saccharin (SS) and compositions composed of mixtures of the two were analyzed by a flavor panel comprised of five experienced tasters and each sample was evaluated at least three times. Samples were examined at about 22 degrees centigrade and each panel member consumed 3-5 milliliters of solution. The test solutions were compared with a 10% sucrose solution to make certain that they were iso-sweet. Solutions were defined as iso-sweet when the flavor panel assessed that the solutions were equal in sweetness. The precision of sweetness determination is limited to about 10% of the sweetness level.

Stock solutions were prepared for each sweetener using 1.0 gram of material diluted to 100 milliliters volume using distilled water. Serial dilutions were prepared from the stock solutions for samples to be used in the flavor analysis. The concentrations of APM and SS necessary to result in predetermined ratios at an equivalent sweetness to 10% sucrose are shown in Table 1.

TABLE 1

| Ratio | | Actual weights (gm./100 ml.) | |
|---|---|---|---|
| APM | SS | APM | SS |
| 1 | 0 | 0.075 | --- |
| 0 | 1 | --- | 0.05 |
| 1 | 1 | 0.0166 | 0.0166 |
| 1 | 2 | 0.010 | 0.020 |
| 1 | 2½ | 0.0083 | 0.0208 |
| 1 | 3 | 0.0072 | 0.0216 |
| 1 | 5 | 0.0058 | 0.0290 |
| 1 | 10 | 0.0035 | 0.0350 |
| 1 | 15 | 0.0031 | 0.0465 |
| 5 | 1 | 0.0275 | 0.0055 |
| 15 | 1 | 0.0450 | 0.003 |

Potency values as a function of concentration were determined by comparing sucrose, APM and SS at various concentrations at which they were iso-sweet. That data is tabulated in Table 2.

TABLE 2

| Sucrose (percent) | APM (percent) | $P_I$ | SS* (percent) | $P_{II}$ |
|---|---|---|---|---|
| 0.34 | 0.0007-0.001 | 400 | 0.00047 | 723 |
| 2.0 | | | 0.0036 | 556 |
| 3.0 | | | 0.0061 | 492 |
| 4.0 | | | 0.0096 | 417 |
| 4.3 | 0.02 | 215 | | |
| 5.0 | | | 0.0142 | 353 |
| 6.0 | | | 0.0204 | 294 |
| 7.0 | | | 0.0273 | 257 |
| 8.0 | | | 0.0359 | 223 |
| 9.0 | | | 0.0444 | 203 |
| 10.0 | 0.075 | 133 | 0.053 (.050) | 194 (200) |
| 15.0 | 0.15 | 100 | | |

*Taufel and Klemm (1925) in Principles of Sensory Evanlation of Food by Amerine, Pangborn and Roessler, Academic Press (1965).

Potency is based on sucrose and is defined as the ratio of concentration of sucrose in solution to concentration of test compound in solution at which the two solutions are determined to be iso-sweet. Interpolated values of potency were determined from Table 2.

The determination of theoretical percent sucrose equivalent (percent S) (i.e., that value of sucrose equivalence which would be expected in a mixture with no synergistic effect) is complicated by the concentration dependence of potency. The potency of a compound in a mixture is a function not only of its concentration but also the presence of other sweeteners. It is possible, however, to calculate high and low limits for theoretical percent sucrose equivalent, thereby bracketing the true value.

The percent S is calculated from the general formula (which neglects any interaction)

$$\text{Percent } S = P_I \times C_I + P_{II} \times C_{II}$$

wherein

Percent S = theoretical percent sucrose equivalent
$P_I$ = potency of APM
$P_{II}$ = potency of SS
$C_I$ = concentration of APM
$C_{II}$ = concentration of SS The lower bound on theoretical percent sucrose equivalent is determined by using potencies which are equal to the potencies that each component would have if each contributed all of the sweetness to the mixture. The potencies are evaluated at the concentration of APM and SS where each is iso-sweet with a 10% sucrose solution. These are the lowest values of potency which the components would have in solution when iso-sweet with 10% sucrose.

The upper bound on the theoretical percent sucrose equivalent is determined using potencies at the concentration of each component independently of the other. These are the largest values for potencies which the components would have in a mixture iso-sweet with a 10% sucrose solution, thus yielding the highest value for percent S.

The lower bound is calculated from the formula $$\text{Percent } S = P_{I \text{ at } 10\%} \times C_I + P_{II \text{ at } 10\%} \times C_{II}$$

wherein

Percent S = theoretical percent sucrose equivalent
$P_{I \text{ at } 10\%}$ = potency of APM evaluated at the concentration of APM iso-sweet with a 10% sucrose solution (constant at 133)
$P_{II \text{ at } 10\%}$ = potency of SS evaluated at the concentration SS iso-sweet with a 10% sucrose solution (constant at 200)
$C_I$ = concentration of APM
$C_{II}$ = concentration of SS and the upper bound is calculated from the formula $$\text{Percent } S = P_{I \text{ at } c_I} \times C_I + P_{II \text{ at } c_{II}} \times C_{II}$$

wherein

Percent S = theoretical percent sucrose equivalent
$P_{I \text{ at } c_I}$ = potency of APM evaluated at the concentration of APM
$P_{II \text{ at } c_{II}}$ = potency of SS evaluated at the concentration of SS
$C_I$ = concentration of APM
$C_{II}$ = concentration of SS The results of these two calculations are presented in Table 3.

TABLE 3

| Ratio | | Percent S (lower bound) | | | Percent S (upper bound) | | |
|---|---|---|---|---|---|---|---|
| APM | SS | APM | SS | Total | APM | SS | Total |
| 1 | 0 | 10 | | 10 | 10 | | 10 |
| 0 | 1 | | 10 | 10 | | 10 | 10 |
| 1 | 1 | 2.2 | 3.3 | 5.5 | 3.9 | 5.4 | 9.3 |
| 1 | 2 | 1.3 | 4.0 | 5.3 | 2.9 | 5.8 | 8.7 |
| 1 | 2½ | 1.1 | 4.2 | 5.3 | 2.5 | 6.0 | 8.5 |
| 1 | 3 | 0.96 | 4.3 | 5.3 | 2.3 | 6.2 | 8.5 |
| 1 | 5 | 0.77 | 5.8 | 6.6 | 1.9 | 7.2 | 9.1 |
| 1 | 10 | 0.47 | 7.0 | 7.5 | 1.3 | 7.9 | 9.2 |
| 1 | 15 | 0.41 | 9.3 | 9.7 | 1.1 | 9.3 | 10 |
| 5 | 1 | 3.7 | 1.1 | 4.8 | 5.2 | 2.8 | 8.0 |
| 15 | 1 | 6.0 | 0.60 | 6.6 | 6.9 | 1.7 | 8.6 |

Since all of the above solutions were iso-sweet with a 10% sucrose solution, synergism is present when the calculated values of total percent S are less than 10. It is apparent from Table 3 that this occurs over a range of ratios of SS to APM of between about 1:15 and 15:1, with the largest synergistic effect being observed at a ratio of SS to APM of between about 1:1 and 1:15.

What is claimed is:

1. A composition adapted for the sweetening of edible materials which comprises saccharin and a dipeptide of the formula

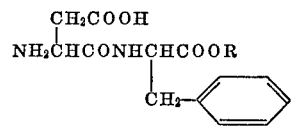

wherein R is a lower alkyl radical, the stereo-chemical configuration is L-L,L-DL,DL-DL or DL-L and the ratio of saccharin to dipeptide is between about 1:15 and 15:1.

2. The composition as in claim 1 wherein the ratio of saccharin to dipeptide is between about 1:5 and 5:1.

3. The composition as in claim 1 wherein the dipeptide is of the formula

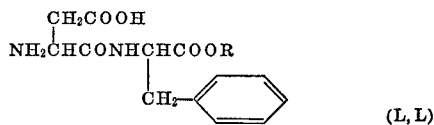

with R being a lower alkyl radical.

4. The composition as in claim 3 wherein the ratio of saccharin to dipeptide is between about 1:5 and 5:1.

5. The composition as in claim 1 wherein the dipeptide is of the formula

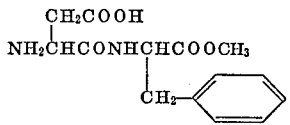

6. The composition as in claim 5 wherein the ratio of saccharin to dipeptide is between about 1:5 and 5:1.

7. The composition as in claim 1 wherein the dipeptide is L-aspartyl-L-phenylalanine methyl ester.

8. The composition as in claim 7 wherein the ratio of saccharin to dipeptide is between about 1:15 and 12.5:1.

9. The composition as in claim 7 wherein the ratio of saccharin to dipeptide is between about 1:5 and 5:1.

10. The composition of claim 1 in the form of a tablet adapted for the sweetening of edible material which comprises, as the active ingredients, 5 milligrams of saccharin and 25 milligrams of L-aspartyl-L-phenylalanine methyl ester.

11. The composition of claim 1 in the form of a tablet adapted for the sweetening of edible materials which comprises 5 milligrams of saccharin and 25 milligrams of L-aspartyl-L-phenylalanine methyl ester together with a suitable solid carrier.

12. The composition of claim 1 in solid form adapted for the sweetening of edible materials which comprises saccharin and L-aspartyl-L-phenylalanine methyl ester in the ratio of about 1:5.

13. A method for the sweetening of edible materials which comprises adding to that material, in the amount which will afford the degree of sweetness desired, a composition containing saccharin and a dipeptide of the following formula

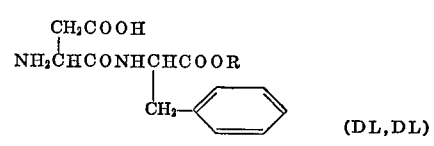

wherein R is a lower alkyl radical and the ratio of saccharin to dipeptide is between about 1:15 and 15:1.

14. The method as in claim 13 wherein the ratio of saccharin to dipeptide is between about 1:5 and 5:1.

15. The method as in claim 13 wherein the dipeptide is of the following formula

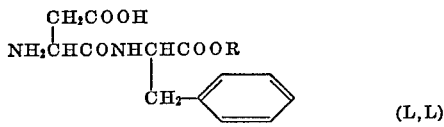

(L,L)

with R being a lower alkyl radical.

16. The method as in claim 15 wherein the ratio of saccharin to dipeptide is between about 1:5 and 5:1.

17. The method as in claim 13 wherein the dipeptide is L-aspartyl-L-phenylalanine methyl ester.

18. The method as in claim 17 wherein the ratio of saccharin to dipeptide is between about 1:15 and 12.5:1.

19. The method as in claim 17 wherein the ratio of saccharin to dipeptide is between about 1:5 and 5:1.

References Cited
UNITED STATES PATENTS
3,492,131   1/1970   Schlatter _____ 99—141

OTHER REFERENCES
Rose, The Condensed Chemical Dictionary, Reinhold Book Corp., p. 828.

RAYMOND N. JONES, Primary Examiner
T. G. WISEMAN, Assistant Examiner

U.S. Cl. X.R.
426—212, 380